United States Patent
Wang et al.

(10) Patent No.: US 7,630,826 B2
(45) Date of Patent: Dec. 8, 2009

(54) METHOD FOR ON-BOARD DIAGNOSIS OF COLD START EMISSIONS REDUCTION CONTROL STRATEGY

(75) Inventors: Wenbo Wang, Novi, MI (US); John L. Lahti, Novi, MI (US); Christopher A Gillanders, Royal Oak, MI (US); Robert J. Genslak, Macomb, MI (US); John F. Van Gilder, Webberville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 193 days.

(21) Appl. No.: 11/673,870

(22) Filed: Feb. 12, 2007

(65) Prior Publication Data
US 2008/0195297 A1    Aug. 14, 2008

(51) Int. Cl.
*G06F 19/00* (2006.01)
*G01M 15/10* (2006.01)

(52) U.S. Cl. .................... 701/113; 73/114.75

(58) Field of Classification Search .............. 700/28, 700/32; 702/41, 44, 182, 183; 701/101, 701/102, 103, 110, 113; 73/114.13, 114.15, 73/114.69, 114.71, 114.75
See application file for complete search history.

(56) References Cited

U.S. PATENT DOCUMENTS

| 4,393,696 A | * | 7/1983 | Willis et al. | ............. 73/114.74 |
| 6,871,136 B1 | * | 3/2005 | Wang et al. | ................. 701/114 |

* cited by examiner

*Primary Examiner*—Michael Cuff
*Assistant Examiner*—Ka Chun Leung (57) ABSTRACT

A diagnostic cold start emissions control system for an internal combustion engine includes a control module having a calculated engine-out energy module, an engine-out energy residual module, and a diagnostic system evaluation module. The calculated engine-out energy module is in communication with the engine-out energy residual module and is configured to determine an operating engine-out energy flow based on an operating engine torque. The engine-out energy residual module is in communication with the diagnostic system evaluation module and is configured to determine an engine-out energy residual based on the determined engine-out energy flow and an expected engine-out energy flow. The diagnostic system evaluation module is configured to determine whether the determined engine-out energy residual meets a predetermined value indicative of proper cold start emissions control.

20 Claims, 9 Drawing Sheets

METHOD FOR ON-BOARD DIAGNOSIS OF COLD START EMISSIONS REDUCTION CONTROL STRATEGY

FIELD

The present disclosure relates to engine control systems for vehicles, and more specifically to a diagnostic system for monitoring a cold start emissions reduction control system.

BACKGROUND

The statements in this section merely provide background information related to the present disclosure and may not constitute prior art.

Catalytic converters reduce exhaust gas emissions in vehicles using an internal combustion engine. A three-way catalytic converter includes a substrate with a coating of catalyst materials that stimulate the oxidation of hydrocarbons and carbon monoxide, and the reduction of nitrogen oxides, in the exhaust gas. The catalysts operate optimally when the temperature of the catalysts is above a minimum level and when the air/fuel ratio is stoichiometric. Stoichiometry is defined as an ideal air/fuel ratio, which is 14.7 to 1 for gasoline.

It is desirable to optimize the air/fuel ratio in the engine for performance as well as emissions control. Emissions control is increasingly difficult at startup because the catalysts have not reached the warmed-up operating temperature. There are numerous factors that affect cold start emissions but they may be summarized in two major categories. The first is engine-out emissions and the second is catalyst efficiency. Engine-out emissions are primarily dependent on base engine design, production and function of the engine control system. Catalyst efficiency is directly related to converter temperature for a given converter as designed.

One way to speed up catalytic converter warm-up, or shorten its light-off time at an engine cold start, is to generate high engine-out energy. The energy is mainly dependent on exhaust temperature and mass flow rate while the exhaust gas specific heat capacity does not vary much. Retarding ignition timing and increasing engine idle speed are known engine control methods to reduce cold start emissions. On-board diagnostics version 2 (OBDII) regulations require cold start emissions reduction control strategies to be monitored and that the target conditions necessary to reduce emissions or catalyst light-off time are achieved and emissions do not exceed 1.5 times the applicable FTP (Federal Test Procedures) standards.

SUMMARY

Accordingly, a diagnostic cold start emissions control system for an internal combustion engine includes a control module having a calculated engine-out energy module, an engine-out energy residual module, and a diagnostic system evaluation module. The calculated engine-out energy module is in communication with the engine-out energy residual module and is configured to determine an operating engine-out energy flow based on an operating engine torque. The engine-out energy residual module is in communication with the diagnostic system evaluation module and is configured to determine an engine-out energy residual based on the determined engine-out energy flow and an expected engine-out energy flow. The diagnostic system evaluation module is configured to determine whether the determined engine-out energy residual meets a predetermined value indicative of proper cold start emissions control.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
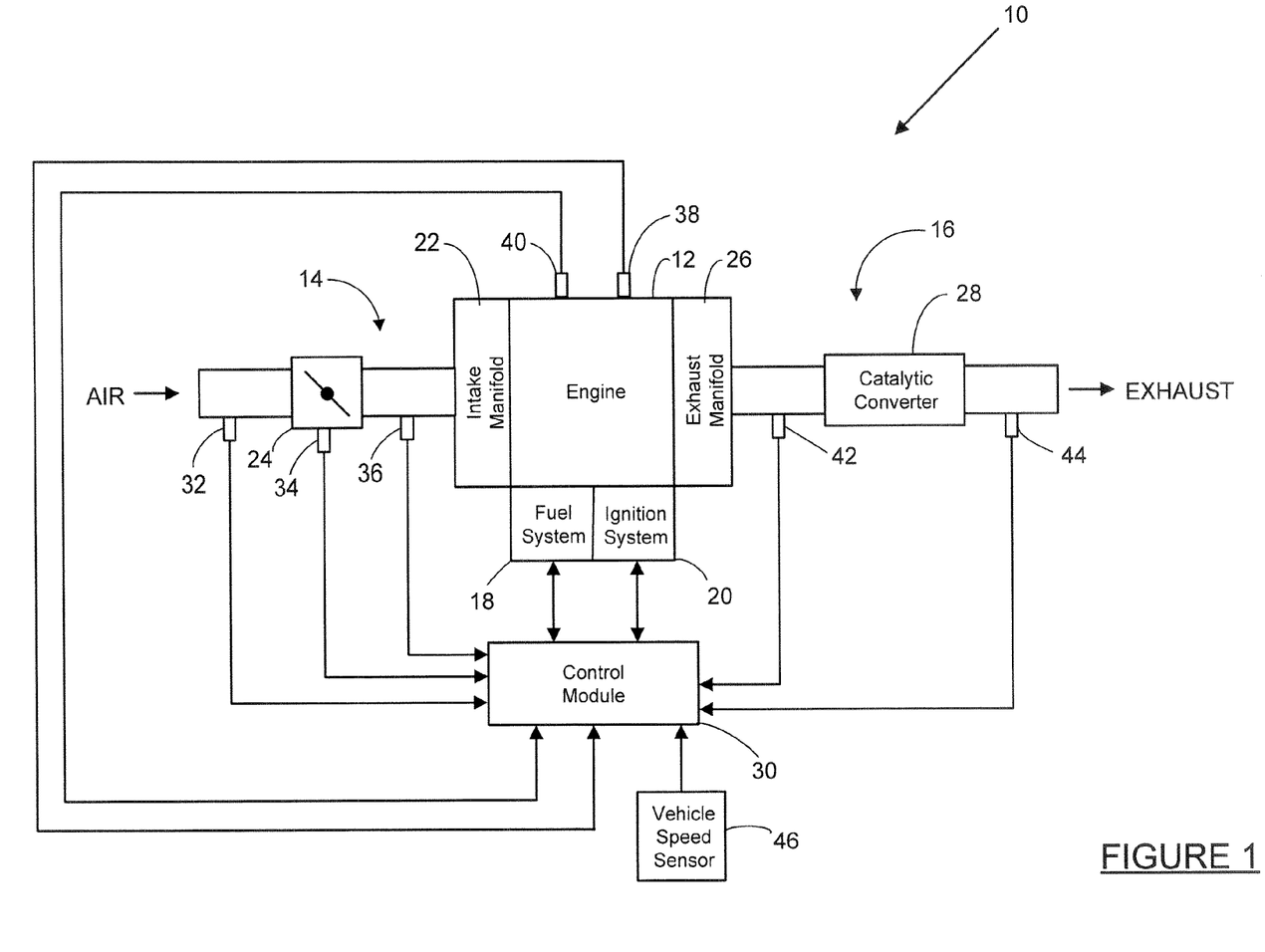
FIG. 1 is a schematic illustration of a vehicle according to the present disclosure.

Referring to FIG. 1, an exemplary vehicle 10 is schematically illustrated. Vehicle 10 may include an engine 12 in communication with an intake system 14, an exhaust system 16, a fuel system 18, and an ignition system 20. Intake system 14 may include an intake manifold 22 and a throttle 24. Throttle 24 may control an air flow into engine 12. Fuel system 18 may control a fuel flow into engine 12 and ignition system 20 may ignite the air/fuel mixture provided to engine 12 by intake system 14 and fuel system 18. Exhaust gas created by combustion of the air-fuel mixture may exit engine 12 through exhaust system 16. Exhaust system 16 may include an exhaust manifold 26 in communication with a catalytic converter 28. Catalytic converter 28 receives exhaust gas from exhaust manifold 26 and may reduce emissions levels of the exhaust gas.

Vehicle 10 may further include a control module 30 in communication with fuel system 18 and ignition system 20. Control module 30 may additionally be in communication with a mass air flow (MAF) sensor 32, a throttle position sensor (TPS) 34, a manifold air pressure (MAP) sensor 36, an engine speed sensor 38, an engine coolant temperature sensor 40, first and second oxygen sensors 42, 44, and a vehicle speed sensor 46.

MAF sensor 32 provides a signal to control module 30 indicative of the air flow rate into engine 12. TPS 34 provides a signal to control module 30 regarding the position of throttle 24. MAP sensor 36 provides a signal to control module 30 indicative of the air pressure in intake manifold 22. Engine speed information is provided to control module 30 by engine speed sensor 38 and coolant temperature is provided by a signal from coolant temperature sensor 40. Oxygen concentration levels in the exhaust stream are provided by signals from first and second oxygen sensors 42, 44 located upstream and downstream of catalytic converter 28. Vehicle speed is provided to control module 30 by vehicle speed sensor 46.

Control module 30 may include a diagnostic cold start emissions control system for monitoring a cold start emissions control system, as discussed below. Control module 30 may include a series of modules shown in FIG. 2, forming the diagnostic control system. More specifically, control module 30 may include a calculated engine-out energy module 48, a designed engine-out energy module 50, an engine-out energy residual module 52, a quality measurement module 54, and a diagnostic system evaluation module 56.

Figure 2:
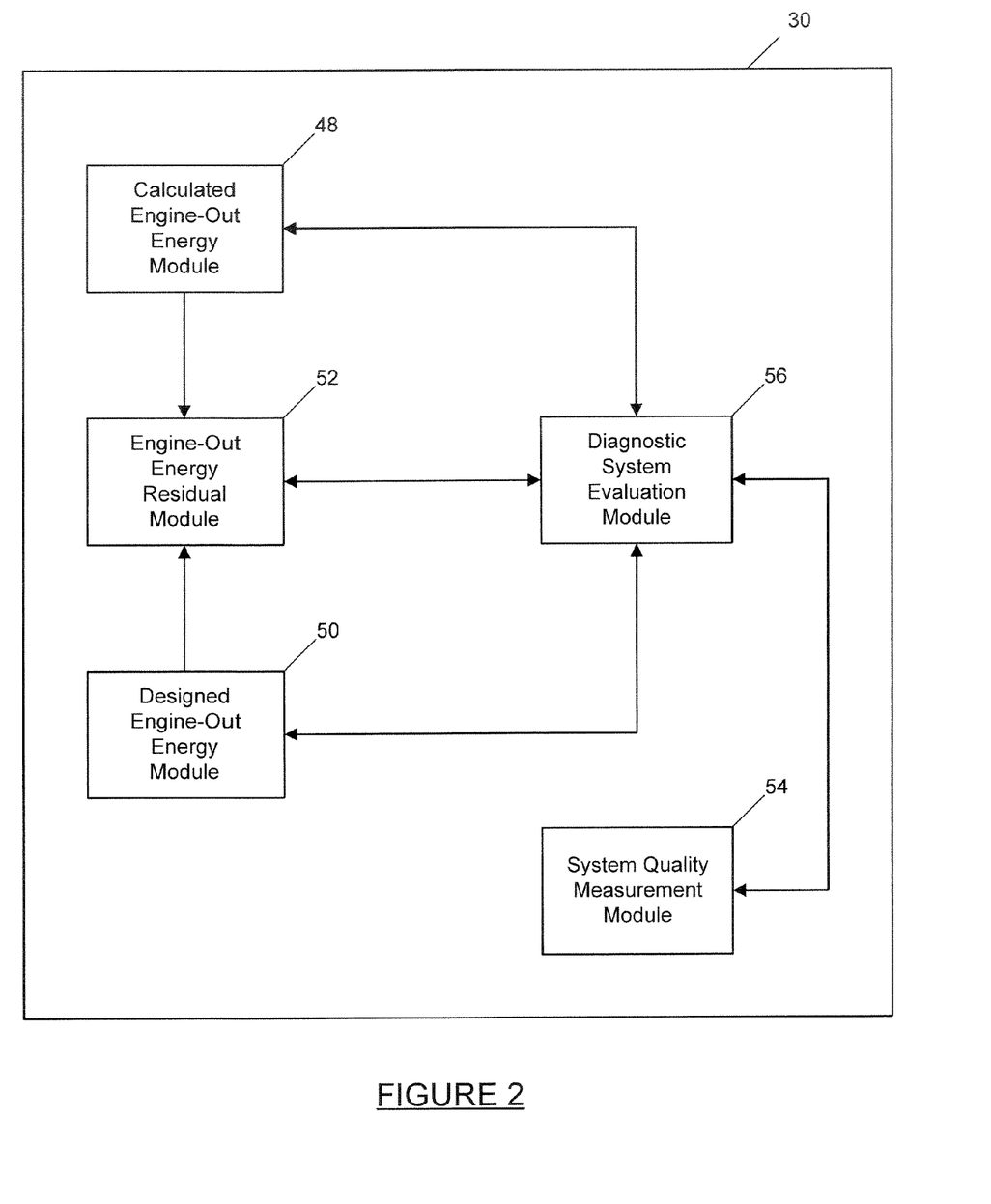
FIG. 2 is a control block diagram of the control module shown in FIG. 1.

Engine-out energy ($\dot{E}$) flow may be generally represented by the following formula:

$$\dot{E}=[f1(\text{rpm})*f2(\text{engineTorque})]*[f3(\text{timing})]=[g/s]*[J/g]=J/s$$

where $f1(\text{rpm})$ represents a function of engine speed, $f2(\text{engineTorque})$ represents a function of engine torque, and $f3(\text{timing})$ represents a function of engine ignition timing. The function of engine speed and the function of engine torque may be used to calculate an engine out mass air flow rate in units of grams (g) per second (s). The function of ignition timing may be used to calculate a thermal energy potential of the exhaust in units of Joules (J) per gram (g). The product of the mass air flow rate of the engine exhaust and the thermal energy potential of the engine exhaust may be used to determine an energy flow rate in units of Joules (J) per second (s).

Calculated engine-out energy module 48 calculates an engine-out energy flow rate based on the functions discussed above using measured idle speed, calculated engine delivered air-based torque, and an actual commanded spark timing. The calculated engine delivered air-based torque may be estimated by a torque model at a current air-per-cylinder, unmanaged spark advance, and friction torque condition. Designed engine-out energy module 50 calculates an engine-out energy flow rate based on the functions discussed above, and is generally similar to calculated engine-out energy module 48, but with the use of designed engine operating parameters instead of actual operating engine parameters. More specifically, designed engine-out energy module 50 calculates an expected (or designed) engine-out energy flow rate based on a designed engine idle speed, a designed commanded spark timing, and a designed engine air-based torque value.

Engine-out energy residual module 52 calculates the engine-out energy residual based on the difference between the calculated engine-out energy provided by calculated engine-out energy module 48 and the designed engine-out energy provided by designed engine-out energy module 50. The engine-out energy residuals may then be qualified by system quality measurement module 54. Generally, system quality measurement module 54 determines a system quality weighting of between 0 and 1 for each engine-out energy residual provided by engine-out energy residual module 52. System quality measurement module 54 evaluates operating conditions of vehicle 10 and verifies that the conditions are within acceptable ranges. The operating conditions may include, but are not limited to, vehicle speed, throttle position, and engine run time. Vehicle speed and throttle position may be used to determine if engine 12 is operating at idle or light load at or close to steady state conditions. Engine run time may be used to ensure a robust system quality measurement detection with reliable evaluation of operating conditions.

When desired during start-up conditions, such as cold start, the engine operating parameters may be evaluated by system quality measurement module 54 and a determination may be made as to whether the parameters are within acceptable ranges. For example, an acceptable range of vehicle speeds may be 0 to 1 mile per hour. An acceptable range of throttle position may include a closed throttle position required for effective engine idling. Acceptable engine run times may include engine run times corresponding to a timeframe consistent with a cold start engine control condition. An exemplary engine run time may generally range from 0 to 60 seconds. The examples of engine operating parameters listed above are merely exemplary and it is understood that a greater or lesser number of parameters may be evaluated by system quality measurement module 54.

System quality measurement module 54 determines a system quality weighting of between 0 and 1 corresponding to each engine-out energy residual based on the engine operating parameters discussed above. A system quality weight of 1 may be assigned to an operating condition that well satisfies the acceptable range limit and a weight of 0 may be assigned to an operating parameter that is not within the acceptable range limit. A system quality weight of between 0 and 1 may be assigned depending on the location of the operating parameter within the acceptable range limit. Once a system quality weight is assigned, the product of the system quality weight and the engine-out energy residual may be determined by diagnostic system evaluation module 56, resulting in a qualified engine-out energy residual value. Control module 30 may repeat the determination of engine-out energy residual values at predetermined time steps and average the sum of qualified engine-out residual values based on the sum of system quality weights over a time interval and a determination may be made regarding whether or not the cold start diagnostic system is operating properly, as discussed below. The determination may be made only when the sum of system quality weight exceeds a pre-determined value within the pre-determined engine run time period.

Figure 3:
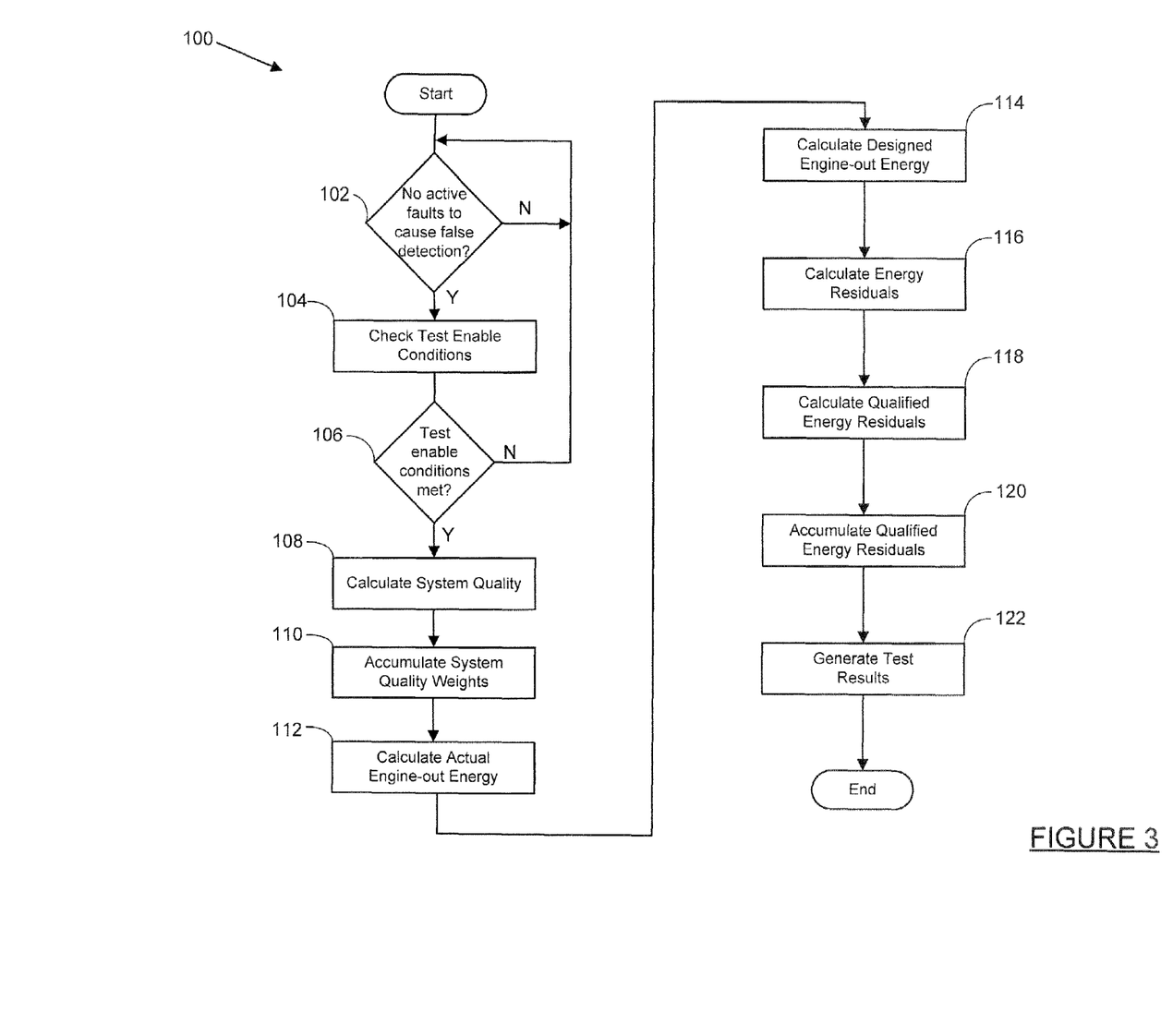
FIG. 3 is a flow diagram illustrating steps for evaluating a cold start emissions diagnostic system according to the present disclosure.

FIG. 3 depicts the diagnostic cold start emissions control system control logic generally at 100. Control logic 100 may be run on a loop at a series of time intervals over a predetermined time period. Control logic 100 may begin by evaluating whether any applicable active diagnostic faults are detected at determination block 102. The applicable active faults are those that will prevent diagnostic system 100 from making a correct or robust detection. The applicable active faults may include, but are not limited to, MAF sensor fault, intake rationality fault, TPS fault, idle speed control fault, fuel injection fault, spark coil fault, and engine misfire fault. It is understood that other fault signals may be considered. If any active diagnostic faults are detected, control may again return to determination block 102.

If no applicable active diagnostic faults are detected, control logic 100 proceeds to control block 104 where test enable conditions are evaluated, as discussed below. Control logic 100 then proceeds to determination block 106, where an evaluation is made regarding whether test enable conditions are met. If test enable conditions are not met, control logic 100 returns to determination block 102. If test enable conditions are met, control logic 100 proceeds to control block 108 where a system quality is calculated, as discussed below. Control logic 100 then proceeds to control block 110, where system quality weights are accumulated. Accumulation of system quality weights may include determining the sum of the system quality weights assigned to the various operating conditions, as discussed above. Control block 110 may calculate and store a running total of system quality weights over the predetermined time period discussed above.

Control logic may then proceed to control block 112, where actual engine-out energy is calculated, as discussed below. Control logic 100 may then proceed to control block 114, where designed engine-out energy is calculated, as discussed below. After actual engine-out energy and designed engine-out energy are calculated, control logic 100 may proceed to control block 116, where energy residuals are calculated. Once energy residuals are determined, they may be used with the system quality weights to calculate qualified energy residuals, as indicated at control block 118 and discussed below. The qualified energy residuals may then be accumulated at control block 120. Accumulation of the qualified energy residuals may include determining the sum of the qualified energy residuals. Control block 120 may calculate and store a running total of qualified energy residuals over the predetermined time period discussed above. Control logic 100 may then proceed to control block 122 where test results for the cold start diagnostic system are generated. Control logic 100 may then terminate.

Figure 4:
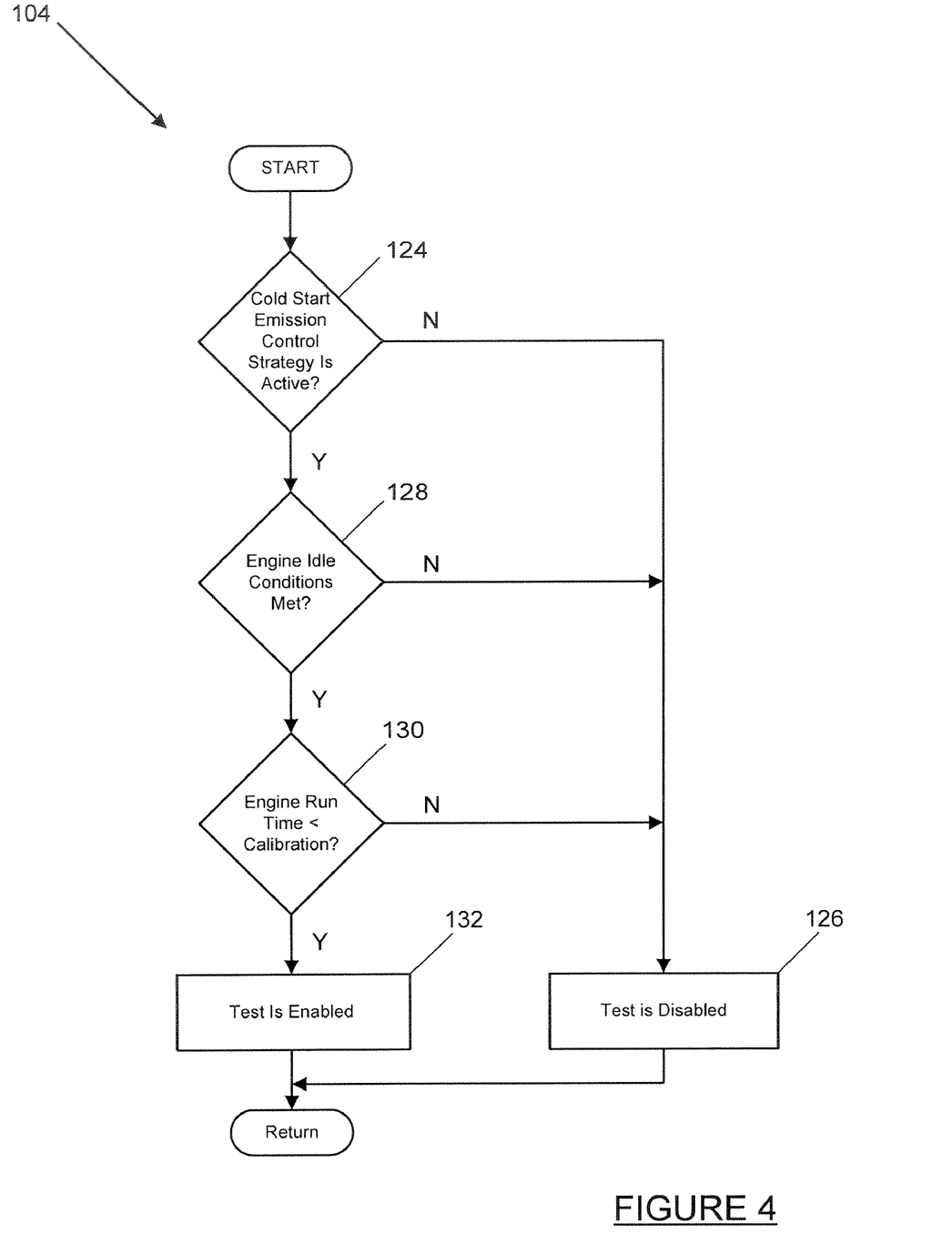
FIG. 4 is a flow diagram illustrating a test enable condition evaluation of FIG. 3.

With additional reference to FIG. 4, control block 104 is shown in greater detail. As indicated above, control block 104 evaluates test enable conditions. Control logic for control block 104 may begin at determination block 124 where the state of a cold start emission control strategy is evaluated. The cold start emission control strategy may include a cold start idle speed control or a cold start spark control. If the cold start emission control strategy is found to be inactive, control proceeds to control block 126 where a test disable flag is set. Control then returns to control logic 100, proceeding to determination block 106 (as seen in FIG. 3), as discussed above. If the cold start emission control strategy is found to be active, control proceeds to determination block 128, where engine idle conditions are evaluated. If engine idle conditions are not met, control again proceeds to control block 126 where a test disable flag is set. Control may then return and proceed to determination block 106 of control logic 100. If engine idle conditions are met, control proceeds to determination block 130. Determination block 130 evaluates whether an engine run time is within a calibrated value. The calibrated value for engine run time may be indicative of an upper time limit characteristic of a cold start condition. If the engine run time is greater than or equal to the calibrated run time, control proceeds to control block 126 where a test disable flag is set. Control may then return and proceed to determination block 106 of control logic 100. If engine run time is less than the calibrated value, control proceeds to control block 132 where a test enable flag is set. Control may then return and proceed to determination block 106 of control logic 100.

Figure 5:
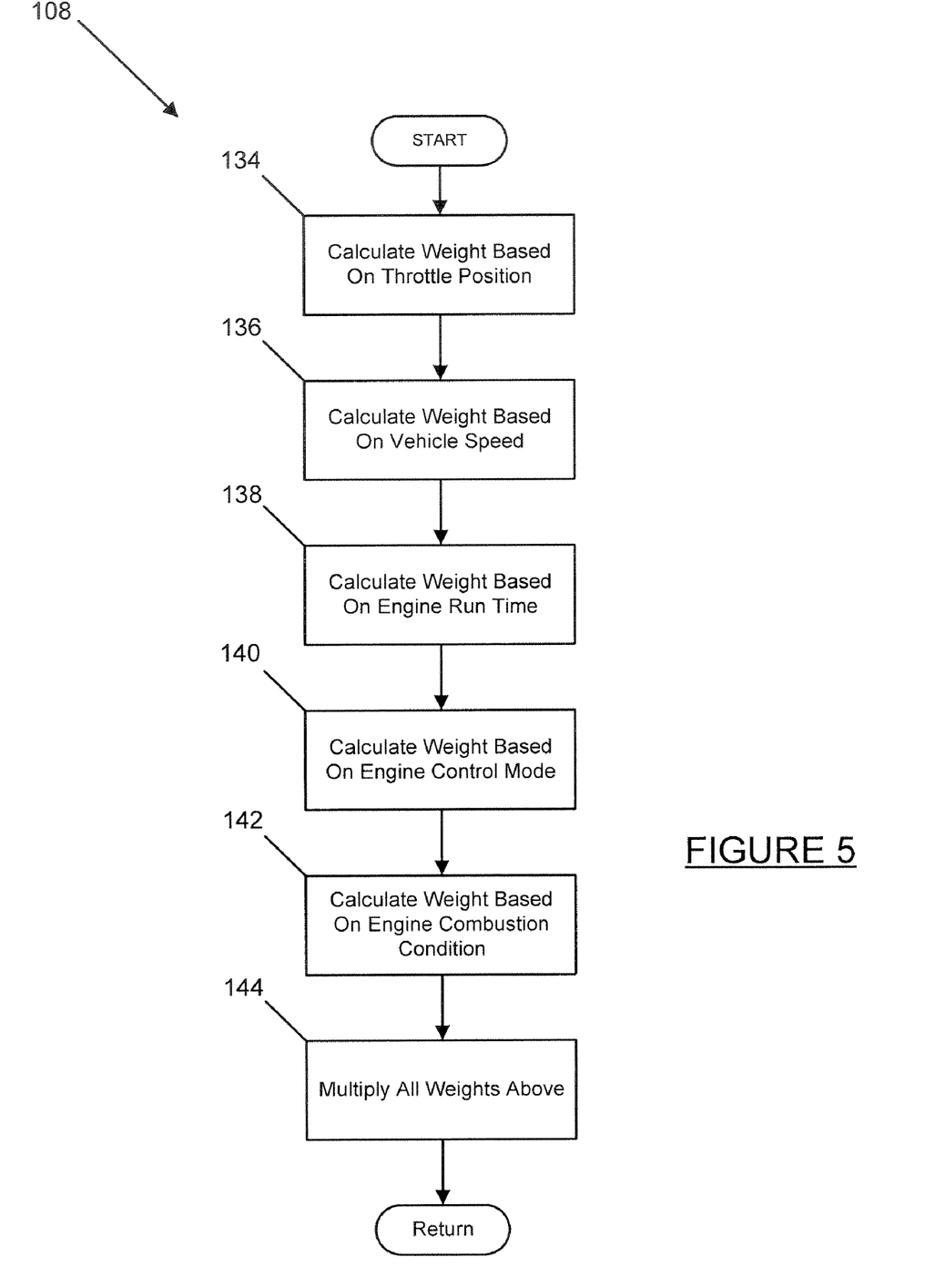
FIG. 5 is a flow diagram illustrating a system quality calculation of FIG. 3.

With reference to FIG. 5, control block 108 is shown in greater detail. As indicated above, control block 108 calculates system quality for engine operating parameters as discussed above. Control logic for control block 108 may begin at control block 134 where a quality weight is calculated based on a throttle position. Throttle position may be determined by TPS 34 or may be a function of the position of a vehicle accelerator pedal. An additional quality weight may then be calculated based on vehicle speed at control block 136. Vehicle speed may be provided by vehicle speed sensor 46. A quality weight based on engine run time may then be calculated at control step 138. The engine run time may generally correspond to the time intervals discussed above. Control block 108 may then calculate a quality weight based on a control mode of engine 12 at control block 140. A quality weight may then be calculated based on an engine combustion condition at control block 142. Control block 144 may then determine the product of all of the quality weights. Control may then return and proceed to control block 110 (seen in FIG. 3).

Figure 6:
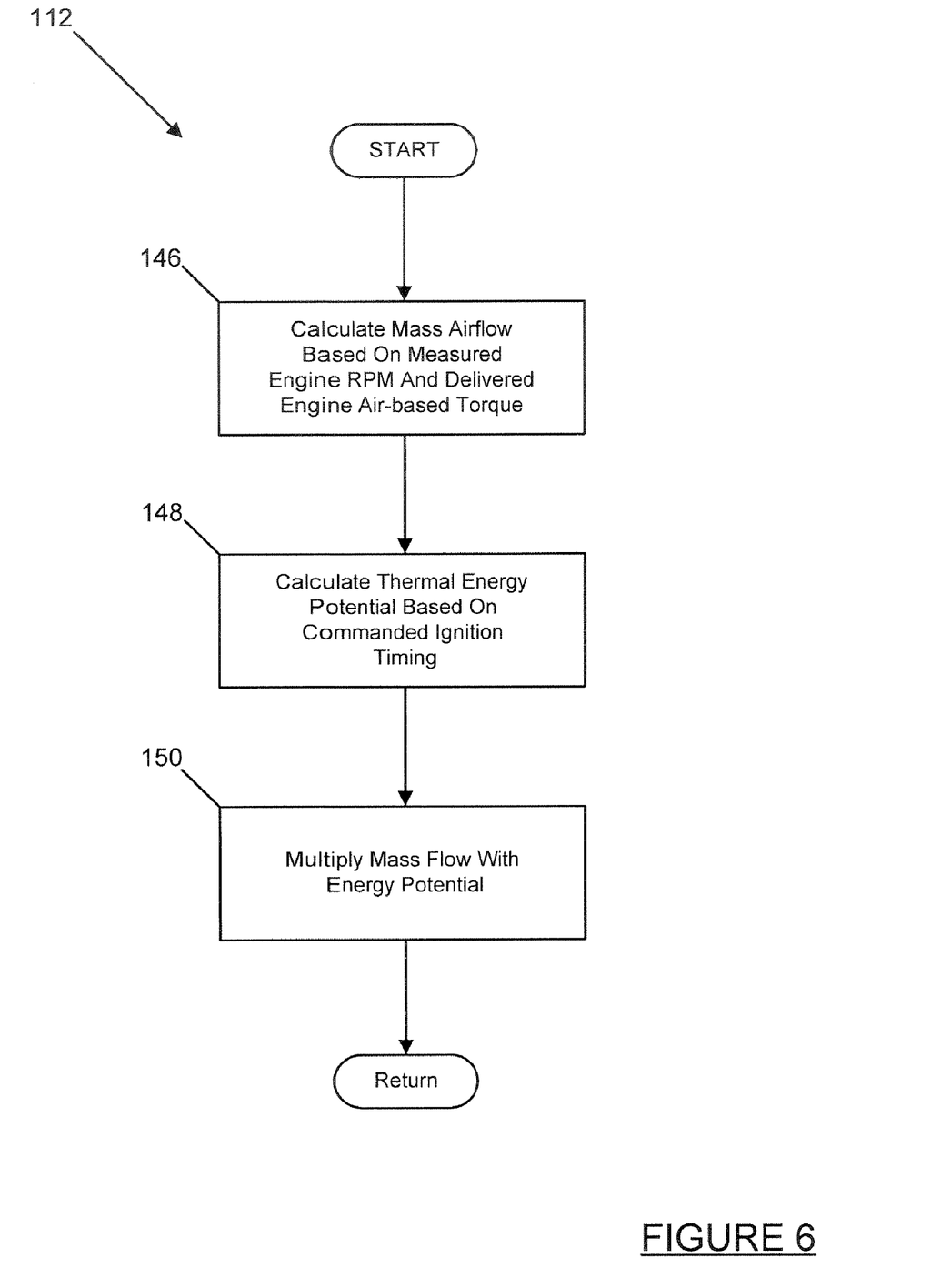
FIG. 6 is a flow diagram illustrating an actual energy-out calculation of FIG. 3.

FIG. 6 depicts control block 112 in greater detail. As indicated above, control block 112 calculates actual engine-out energy. Control logic for control block 112 begins at control block 146 where mass air flow rate is calculated as discussed above. The mass air flow rate may be determined by multiplying a function of engine speed (RPM) by a function of engine air-based torque. The engine speed may be a measured engine speed and the engine air-based torque may be a delivered engine air-based torque. Control block 148 may then calculate thermal energy potential based on commanded engine timing. The calculated mass air flow rate from control block 146 and the calculated thermal energy potential from control block 148 may then be multiplied together at control block 150 to determine actual engine-out energy. Control may then return and proceed to control block 114 (seen in FIG. 3).

Figure 7:
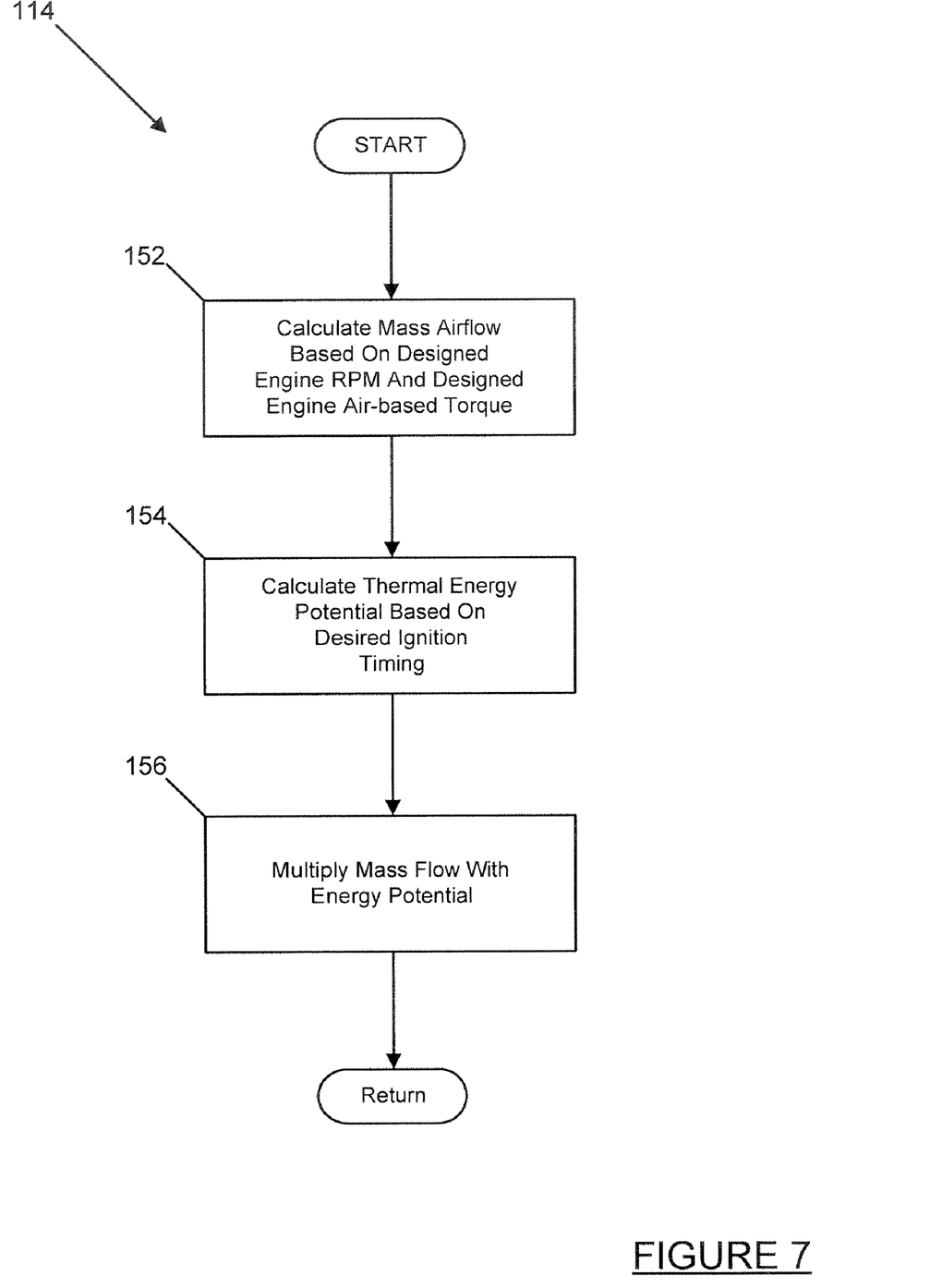
FIG. 7 is a flow diagram illustrating a designed engine-out energy calculation of FIG. 3.

With reference to FIG. 7, control block 114 is shown in greater detail. As indicated above, control block 114 calculates designed engine-out energy. Control logic for control block 114 begins at control block 152 where designed mass air flow rate is calculated based on designed engine speed (RPM) and designed engine air-based torque. Designed engine speed and designed engine air-based torque may be an engine speed and air-based torque corresponding to a theoretical cold start condition. Control block 154 may then calculate thermal energy potential based on designed engine timing. The designed parameters may be parameters corresponding to a desired value at cold start conditions based on the design of engine 12. The calculated mass air flow rate from control block 152 and the calculated thermal energy potential from control block 154 may then be multiplied together at control block 156 to determine designed engine-out energy. Control may then return and proceed to control block 116 (seen in FIG. 3).

Figure 8:
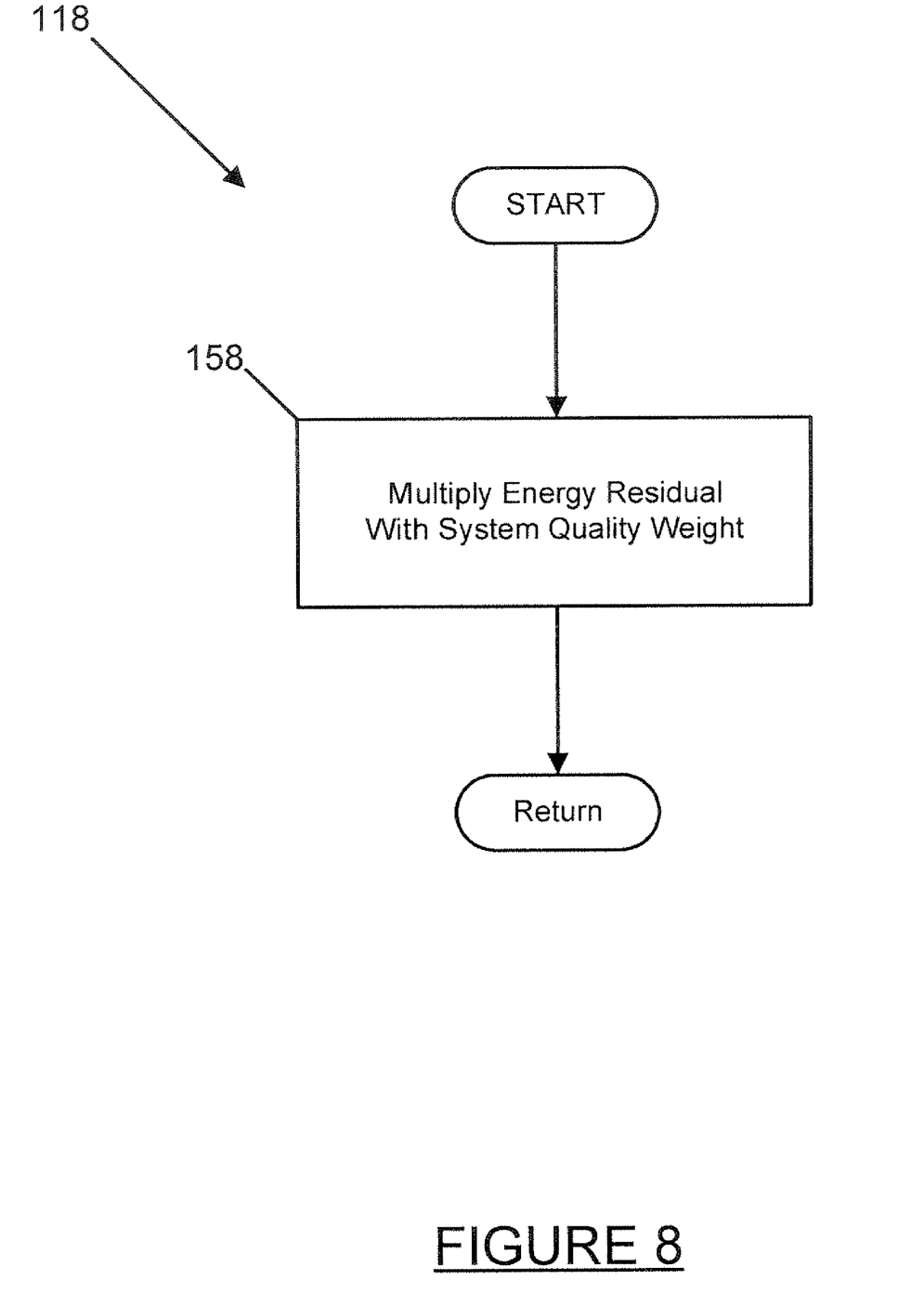
FIG. 8 is a flow diagram illustrating a qualified energy residual calculation of FIG. 3.

FIG. 8 shows control block 118 in greater detail. As indicated above, control block 118 calculates qualified energy residuals. Control logic for control block 118 begins at control block 158 where the energy residual calculated at control block 116 is multiplied by the system quality weight calculated at control block 108 to calculate a qualified energy residual. Control may then return and proceed to control block 120 (seen in FIG. 3).

Figure 9:
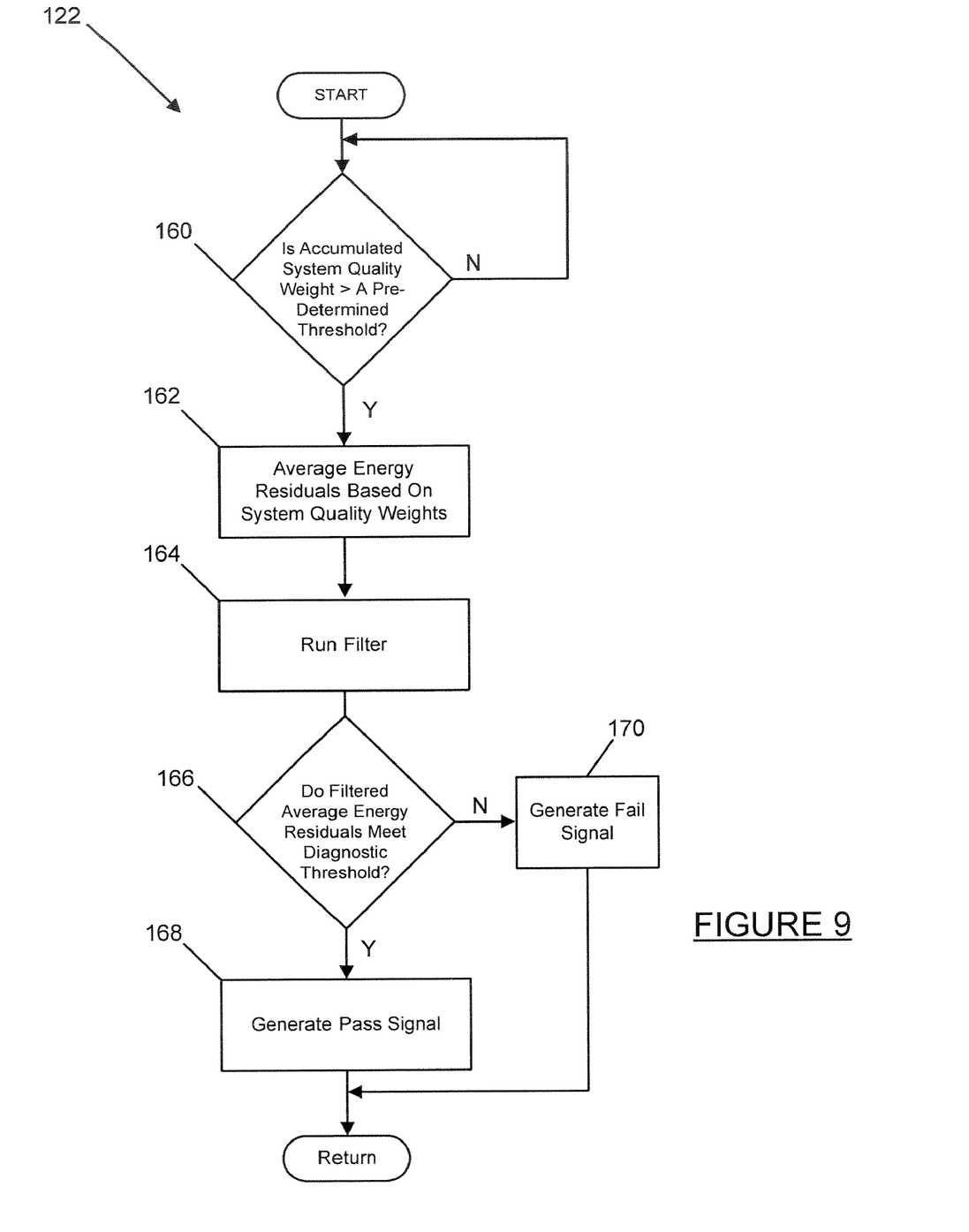
FIG. 9 is a flow diagram illustrating the generation of test results of FIG. 3.

With reference to FIG. 9, control block 122 is shown in greater detail. As indicated above, control block 122 generates test results. More specifically, control logic for control block 122 begins at determination block 160 where the accumulated system quality weight from control block 110 is evaluated. If the accumulated system quality weight is not above a predetermined threshold value, no test results or diagnostic decisions are made and control loops back. If the accumulated system quality weight is above a predetermined threshold, control proceeds to control block 162 where qualified energy residuals are averaged. More specifically, the accumulated qualified energy residuals from control block 120 may be divided by the accumulated system quality weights from control block 110 to determine the average energy residuals. The averaged energy residuals may then be run through a filter, such as an exponentially weighted moving average (EMWA) filter, as indicated at control block 164. The filtered averaged energy residuals may then be compared to a diagnostic threshold at determination block 166. If the diagnostic threshold is met the system is functioning properly and a pass signal is generated at control block 168. If the diagnostic threshold is not met the system is not functioning properly and a fail signal is generated at control block 170. Control then returns and proceeds to end control logic 100 (seen in FIG. 3).

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of verifying cold start emissions control of an internal combustion engine, comprising:
   measuring an operating engine speed of the engine;
   determining an operating engine torque of the engine;
   determining an actual energy flow from engine exhaust gas based on the measured engine speed and the determined engine torque;
   determining an energy flow residual based on the actual energy flow and an expected energy flow;
   comparing the determined energy flow residual to a predetermined value indicative of proper cold start emissions control; and
   generating a signal indicating whether the cold start emissions control of the engine is operating within a predetermined diagnostic threshold based on said comparing.

2. The method of claim 1, further comprising determining a commanded ignition timing of the engine, wherein the determined engine torque is an operating engine torque associated with the measured engine speed and determined ignition timing.

3. The method of claim 1, further comprising assigning a system quality weight to the determined energy flow residual based on an operating condition.

4. The method of claim 3, wherein said determining an energy flow residual includes determining a series of energy flow residuals over a predetermined time period, each of the determined energy flow residuals being assigned a quality weight based on an operating condition associated therewith.

5. The method of claim 4, wherein said assigning includes determining a series of weighted energy flow residuals based on the product of the determined energy flow residuals and their corresponding quality weights.

6. The method of claim 5, wherein said determining an energy flow residual includes determining an average weighted energy flow residual based on summing the series of weighted energy flow residuals and summing the corresponding quality weights, the average weighted energy flow residual being determined by dividing the sum of the series of weighted energy flow residuals by the sum of the corresponding quality weights.

7. The method of claim 1, further comprising determining an expected engine torque and determining the expected energy flow based on the expected engine torque.

8. The method of claim 7, further comprising determining an expected engine speed and an expected commanded ignition timing, wherein the expected engine torque, expected engine speed, and expected ignition timing are designed parameters associated with a cold start condition.

9. The method of claim 7, wherein the expected engine torque is used to determine an expected engine mass air flow rate.

10. The method of claim 1, wherein the determined engine torque is used to calculate an operating mass air flow rate.

11. The method of claim 1, wherein said determining an energy flow residual includes determining the difference between the actual energy flow and the expected energy flow.

12. A method of verifying cold start emissions control in an internal combustion engine, comprising:
    measuring an operating engine speed of the engine;
    determining a commanded ignition timing of the engine;
    determining an operating engine torque of the engine;
    determining an actual energy flow from the engine exhaust gas based on the measured engine speed, commanded ignition timing, and operating engine torque;
    determining an energy flow residual based on the actual energy flow and an expected energy flow;
    assigning a system quality weight to the energy flow residual based on a predetermined operating condition;
    determining a weighted energy flow residual based on said assigning;
    accumulating a plurality of system quality weights over a predetermined time;
    accumulating a plurality of weighted energy flow residuals corresponding to the accumulated system quality weights over the predetermined time;
    determining an average engine-out energy flow residual based on the accumulated weighted energy flow residuals and the accumulated system quality weights;
    comparing the determined average engine-out energy flow residual to a predetermined value indicative of proper cold start emissions control; and
    generating a signal indicating whether the cold start emissions control of the engine is operating within a predetermined diagnostic threshold based on said comparing.

13. The method of claim 12, wherein said determining an energy flow residual includes determining the difference between the actual energy flow and the expected energy flow.

14. The method of claim 12, wherein said determining an average engine-out energy flow residual includes dividing the accumulated weighted energy flow residuals by the accumulated system quality weights.

15. The method of claim 12, further comprising determining an expected engine torque and determining the expected energy flow based on the expected engine torque.

16. The method of claim 12, wherein the determined engine torque is used to calculate an operating mass air flow rate.

17. A control module comprising:
    a calculated engine-out energy module configured to determine an operating engine-out energy flow from engine exhaust gas during operation of an internal combustion engine based on a measured operating engine speed of the engine and an operating engine torque of the engine;
    an engine-out energy residual module being in communication with said calculated engine-out energy module and configured to determine an engine-out energy residual based on the determined engine-out energy flow and an expected engine-out energy flow; and
    a diagnostic system evaluation module in communication with said engine-out energy residual module and configured to determine whether the determined engine-out energy residual meets a predetermined value indicative of proper cold start emissions control.

18. The control module of claim 17, wherein said calculated engine-out energy module is configured to measure the operating engine speed and to determine a commanded ignition timing of the engine for determining the operating engine-out energy flow.

19. The control module of claim 17, further comprising a quality measurement module configured to determine a system quality weight based on a vehicle operating parameter and to assign the system quality weight to the determined engine-out energy residual.

20. The control module of claim 17, further comprising a designed engine-out energy module being in communication with said engine-out energy residual module and configured to determine the expected engine-out energy flow.

* * * * *